United States Patent
Chang

(10) Patent No.: US 12,327,922 B2
(45) Date of Patent: Jun. 10, 2025

(54) BEAMFORMING APPARATUS AND BEAM CONTROLLING METHOD

(71) Applicant: TMY Technology Inc., Taipei (TW)

(72) Inventor: Su-Wei Chang, Taipei (TW)

(73) Assignee: TMY Technoloy Inc., Taipei (TW)

( * ) Notice: Subject to any disclaimer, the term of this patent is extended or adjusted under 35 U.S.C. 154(b) by 494 days.

(21) Appl. No.: 17/878,926

(22) Filed: Aug. 2, 2022

(65) Prior Publication Data

US 2023/0073838 A1    Mar. 9, 2023

Related U.S. Application Data

(60) Provisional application No. 63/241,503, filed on Sep. 7, 2021.

(30) Foreign Application Priority Data

Dec. 28, 2021  (TW) .................................. 110149040

(51) Int. Cl.
*H01Q 3/24* (2006.01)
*H04B 7/0426* (2017.01)
*H04B 7/06* (2006.01)

(52) U.S. Cl.
CPC ............... *H01Q 3/24* (2013.01); *H04B 7/043* (2013.01); *H04B 7/0617* (2013.01)

(58) Field of Classification Search
CPC ......... H01Q 3/24; H04B 7/043; H04B 7/0617
See application file for complete search history.

(56) References Cited

U.S. PATENT DOCUMENTS

| | | | | |
|---|---|---|---|---|
| 2002/0135513 A1* | 9/2002 | Paschen | ................. | H01Q 3/267 342/371 |
| 2006/0072650 A1* | 4/2006 | Kent | .................... | H04B 1/7115 375/147 |
| 2010/0075607 A1* | 3/2010 | Hosoya | .................. | H04B 7/086 455/42 |

(Continued)

FOREIGN PATENT DOCUMENTS

| CN | 211907697 | 11/2020 |
|---|---|---|
| CN | 108736160 | 12/2020 |

(Continued)

OTHER PUBLICATIONS

Kuikui Fan et al., "Cylindrical Conformal Array Antenna with Fan-shaped Beam for Millimeter-wave Application", 2015 International Symposium on Antennas and Propagation (ISAP), Nov. 9-12, 2015, pp. 1-3.

(Continued)

*Primary Examiner* — Raymond S Dean
(74) *Attorney, Agent, or Firm* — JCIPRNET

(57) ABSTRACT

A beamforming apparatus and beam controlling method are provided. The beamforming apparatus includes a non-flat substrate, an antenna array, and an adjusting circuit. The antenna array includes multiple antenna units and are disposed at the non-flat substrate. The adjusting circuit is coupled with the antenna array. The adjusting circuit is used to adjust the signal of at least one of the antenna units according to the shape of the non-flat substrate and a predetermined signal angle. Therefore, it could be implemented in various scenario with flexibility.

24 Claims, 8 Drawing Sheets

(56) References Cited

U.S. PATENT DOCUMENTS

| | | | |
|---|---|---|---|
| 2010/0079347 A1 | 4/2010 | Hayes et al. | |
| 2018/0048364 A1* | 2/2018 | Girnyk | H04B 7/0456 |
| 2018/0254559 A1 | 9/2018 | Chopra | |
| 2019/0089052 A1* | 3/2019 | Yong | H01Q 9/0407 |
| 2020/0067195 A1* | 2/2020 | Byers | H01Q 1/2283 |
| 2021/0293950 A1 | 9/2021 | Shams | |

FOREIGN PATENT DOCUMENTS

| | | |
|---|---|---|
| EP | 3267532 | 1/2018 |
| TW | 201717523 | 5/2017 |
| TW | 201943053 | 11/2019 |

OTHER PUBLICATIONS

"Office Action of Japan Counterpart Application", issued on Sep. 19, 2023, p. 1-p. 3.
Robert J. Mailloux, "Phased Array Antenna Handbook", Second Edition, Artech House antennas and propagation library, Jan. 1, 2005, pp. 10-34.
"Search Report of Europe Counterpart Application", issued on Aug. 8, 2022, p. 1-p. 13.
"Office Action of Taiwan Counterpart Application", issued on Nov. 21, 2022, p. 1-p. 9.

* cited by examiner

BEAMFORMING APPARATUS AND BEAM CONTROLLING METHOD

CROSS-REFERENCE TO RELATED APPLICATION

This application claims the priority benefit of U.S. provisional application Ser. No. 63/241,503, filed on Sep. 7, 2021, and Taiwan application serial no. 110149040, filed on Dec. 28, 2021. The entirety of each of the above-mentioned patent applications is hereby incorporated by reference herein and made a part of this specification.

BACKGROUND

Technology Field

The disclosure relates to a beamforming technology, and particularly to, a beamforming apparatus and a beam controlling method.

Description of Related Art

In high frequency applications, beamformers can be used to improve the directivity of an antenna system. Generally speaking, an antenna array may be disposed on a flat substrate. However, such a design may not meet the requirements of some applications. For example, due to the high path loss caused by the wavelet length of the millimeter wave (mmWave), the millimeter wave antenna array is required to be disposed on a car shell. However, car shells are usually non-flat. Accordingly, there is a need for a non-flat antenna array design.

SUMMARY

In view of this, embodiments of the disclosure provide a beamforming apparatus and a beam controlling method and can implement a non-flat antenna array system.

The beamforming apparatus of the embodiments of the disclosure includes (but is not limited to) a non-flat substrate, an antenna array, and an adjusting circuit. The antenna array includes multiple antenna units and is disposed on the non-flat substrate. The adjusting circuit is coupled to the antenna array and configured to adjust a signal of at least one of the antenna units according to a shape of the non-flat substrate and a predetermined signal angle.

The beam controlling method of the embodiments of the disclosure includes (but is not limited to) steps as follows. A non-flat substrate and an antenna array are provided. The antenna array includes multiple antenna units. A signal of at least one of the antenna units is adjusted according to a shape of the non-flat substrate and a predetermined signal angle.

In summary, according to the beamforming apparatus and the beam controlling method of the embodiments of the disclosure, an antenna array disposed on a curved surface is provided, and the signal of the antenna unit can be adjusted so that the antenna array radiates electromagnetic waves according to the desired steering angle. Accordingly, the disclosure can be flexibly applied in more scenarios.

In order to make the features and advantages of the disclosure comprehensible, embodiments accompanied with drawings are described in detail below.

DESCRIPTION OF THE EMBODIMENTS

Figure 1:
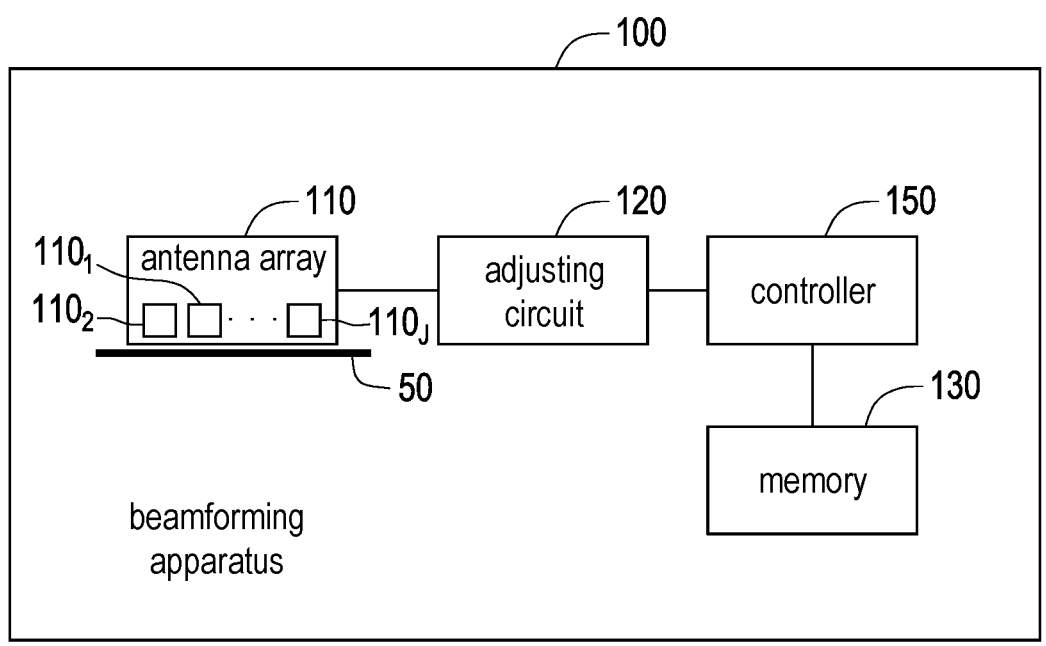
FIG. 1 is a component block view of a beamforming apparatus according to an embodiment of the disclosure.

FIG. 1 is a component block view of a beamforming apparatus 100 according to an embodiment of the disclosure. Referring to FIG. 1, the beamforming apparatus 100 includes (but is not limited to) a non-flat substrate 50, an antenna array 110, an adjusting circuit 120, a memory 130, and a controller 150.

Figure 2A:
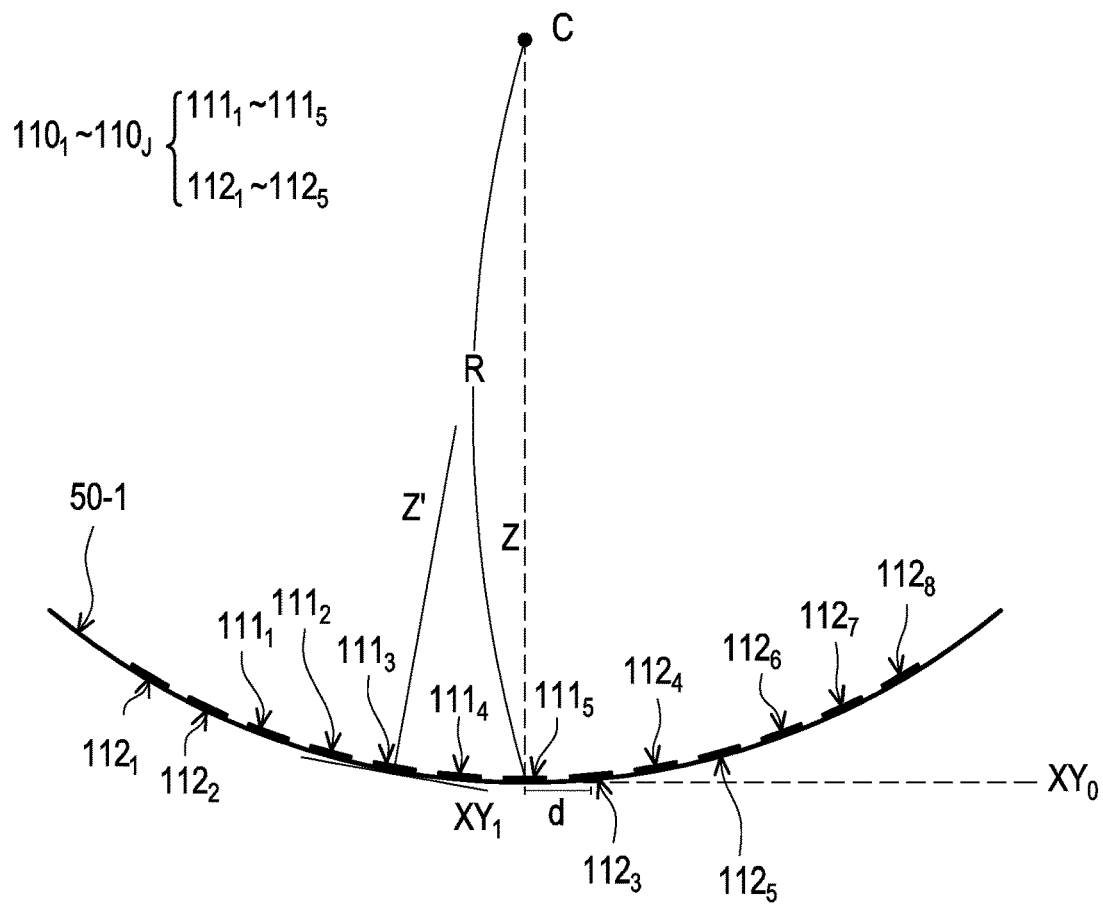
FIG. 2A is a schematic view of an antenna unit and a non-flat substrate according to an embodiment of the disclosure.
Figure 2B:
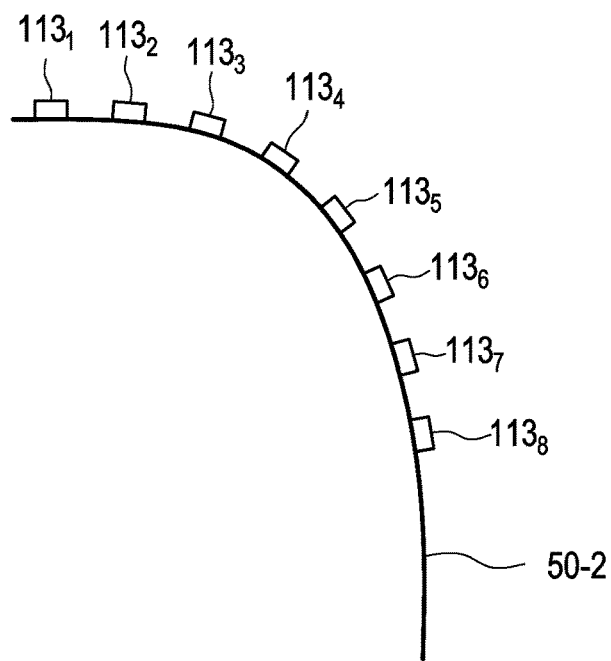
FIG. 2B is a schematic view of an antenna unit and a non-flat substrate according to another embodiment of the disclosure.

The non-flat substrate 50 may have a uniform curved surface or an arbitrary curved surface. For example, FIG. 2A is a schematic view of antenna units $111_1$ to $111_5$, antenna units $112_1$ to $112_8$, and a non-flat substrate 50-1 according to an embodiment of the disclosure. Referring to FIG. 2A, the arc surface of the non-flat substrate 50-1 has a common center point C, and a distance R from any two points on the arc surface to the center point C is the same (e.g., a uniform curved surface). In another example, FIG. 2B is a schematic view of antenna units $113_1$ to $113_8$ and a non-flat substrate 50-2 according to another embodiment of the disclosure. Referring to FIG. 2B, the non-flat substrate 50-2 may have multiple curvatures. However, the surface shape of the non-flat substrate 50 may have other variations, and it is not limited to the embodiment of the disclosure.

The antenna array 110 includes multiple antenna units $110_1$ to $110_J$ (J is a positive integer and is the total number of antenna units). The antenna units $110_1$ to $110_J$ of the antenna array 110 are disposed on the non-flat substrate 50. Taking FIG. 2A as an example, the antenna units $111_1$ to $111_5$ and the antenna units $112_1$ to $112_8$ are disposed on the concave surface of the non-flat substrate 50-1. Taking FIG. 2B as an example, the antenna units $113_1$ to $113_8$ are disposed on the convex surface of the non-flat substrate 50-2.

The adjusting circuit 120 is coupled to the antenna array 110. In an embodiment, the adjusting circuit 120 includes one or more phase shifters, and each phase shifter is configured to adjust the phase of signal transmission or the phase of signal reception of an antenna unit $110_1$, $110_2$, ... or $110_J$. In some embodiments, the signal transmission or the signal reception of the antenna units $110_1$, $110_2$, ..., and/or $110_J$ have different phases. In another embodiment, the adjusting circuit 120 includes one or more amplifiers and/or amplitude attenuators, and one amplifier is configured to adjust the amplitude of the signal transmission or the amplitude of the signal reception of one or more antenna units $110_1$, $110_2$, ..., and/or $110_J$. In some embodiments, the adjusting circuit 120 includes one or more phase shifters and one or more amplifiers and adjusts the phase and/or the amplitude of the signal transmission or the phase and/or the amplitude of the signal reception of one or more antenna units $110_1$, $110_2$, ..., and/or $110_J$ according to requirements.

The memory 130 can be any type of fixed or removable random access memory (RAM), read only memory (ROM), flash memory, traditional hard disk drives (HDDs), solid-state drives (SSDs), or similar components. In an embodiment, the memory 130 is configured to record program codes, software modules, configuration configurations, data (e.g., the positions of the antenna units $110_1$ to $110_J$, the relationship between these positions and the non-flat substrate 50, and the like) or files. The embodiments are illustrated in detail in the subsequent paragraphs.

The controller 150 is coupled to the adjusting circuit 120 and the memory 150. The controller 150 may be a chip, an application specific integrated circuit (ASIC), a field programmable gate array (FPGA), a microcontroller, or other types of circuits. In an embodiment, the controller 150 determines the desired direction of departure (DoD) and/or half-power beam width (HPBW). In another embodiment, a predetermined DoD and/or HPBW are transmitted to the controller 150 through a command. In an embodiment, the controller 150 can output an adjusting signal/command, and the adjusting circuit 120 is controlled by the controller 150. Accordingly, one or more antenna units $110_1$ to $110_J$ are activated according to the DoD and/or the HPBW, and/or the phase delay and/or the amplitude of the signal transmission or the signal reception of the activated antenna units $110_1$, $110_2$, ..., and/or $110_J$ is changed. In an embodiment, the controller 150 loads program codes and/or data from the memory 130.

Note that by changing the phase and amplitude corresponding to the antenna units $110_1$, $110_2$, ..., and/or $110_J$, electromagnetic waves can be superimposed in a specific direction based on constructive interference and destructive interference and offset in some directions, so that a far field pattern formed by the radiation of the antenna array 110 is equal to a specific beam pattern (a field pattern related to the main beam direction, beam width, directional gain, side beam level and other parameters).

The adjusting circuit 120 adjusts the signal of at least one of the antenna units $110_1$ to $110_J$ according to the shape of the non-flat substrate 50 and a predetermined signal angle. The beams formed by the electromagnetic waves radiated by the multiple antenna units $110_1$ to $110_J$ in the antenna array 110 may have different field patterns (e.g., different radiation directions, gains, or shape) due to different phases or phase differences with the adjacent antenna units $110_1$ to $110_J$. The shape of the non-flat substrate 50 reflects that the antenna units $110_1$ to $110_J$ are disposed in different positions. The signal angle may be the DoD/the angle of departure (AoD) or may also be the direction of arrival (DoA)/the angle of arrival (AoA).

In some embodiments, for the antenna array 110 to achieve a specific direction or gain (i.e., amplitude), the corresponding phase (or delay time) of each antenna unit $110_1$ to $110_J$ may be different, so the adjusting circuit 120 can adjust the phase of all or some of the signal transmission or signal reception of the antenna units $110_1$ to $110_J$, respectively. Accordingly, the signals can be delayed, so that the phases of the signals of the different antenna units $110_1$ to $110_J$ are different, thereby forming a phase difference and further achieving beam patterns of different directions or different shapes.

In an embodiment, the controller 150 selects at least two first units from the antenna units $110_1$ to $110_J$ to radiate electromagnetic waves according to the half-power beam width (HPBW) corresponding to a predetermined signal angle. For example, some or all of the antenna units $110_1$ to $110_J$ are used as the first unit. In an embodiment, the unselected ones of the antenna units $110_1$ to $110_J$ are used as the second unit. In an embodiment, the controller 150 activates the first units through the adjusting circuit 120 and disables the second units. Accordingly, the controller 150 can further radiate electromagnetic waves through those first units but interrupt the radiation of the second units.

Figure 3:
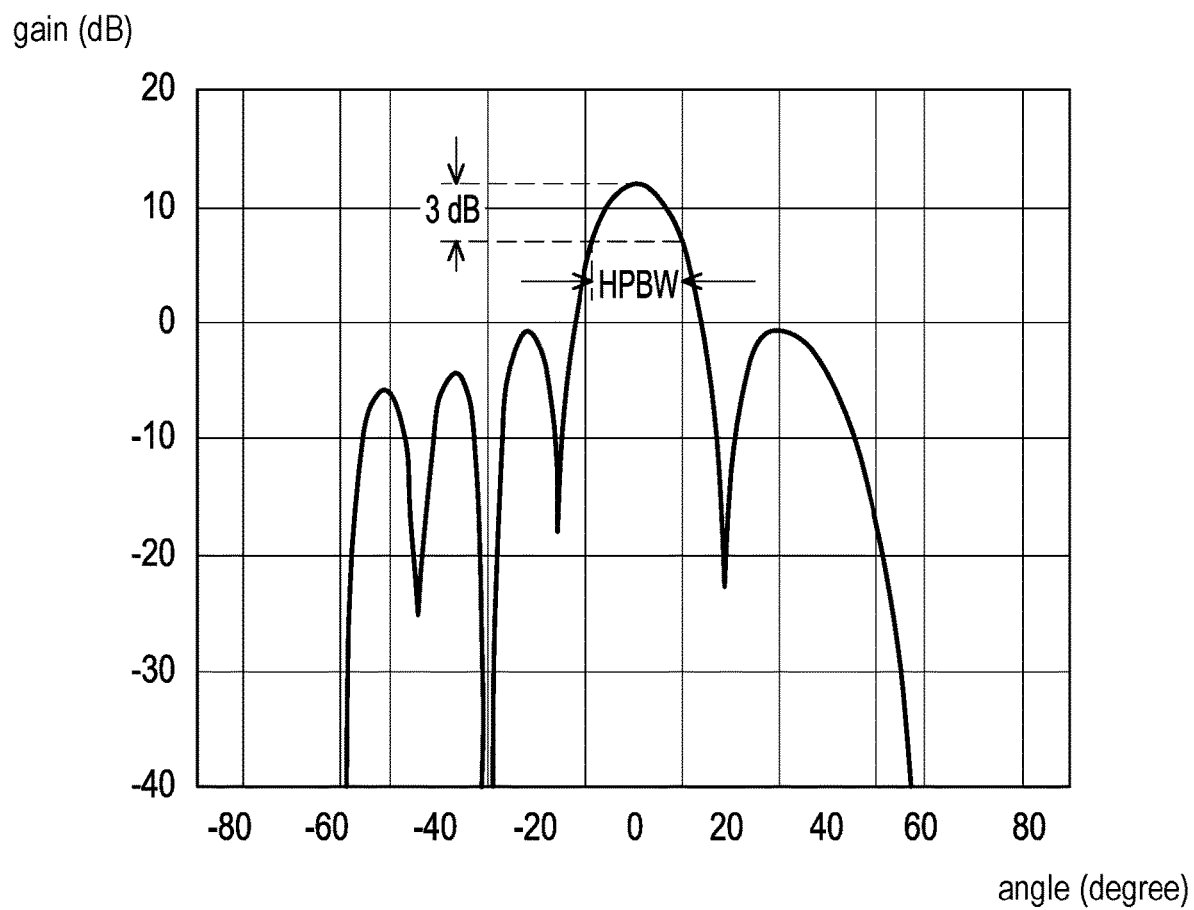
FIG. 3 is a schematic view of a half-power beam width (HPBW) according to an embodiment of the disclosure.

Specifically, taking FIG. 2A as an example, assuming that the steering angle (e.g., 0 degree) of the antenna array 110 is the same as the reference line Z (e.g., the normal direction of the configuration position) and is perpendicular to a reference plane $XY_0$, if the steering angle is zero degrees, the direction of signal (DoS) (corresponding to the signal angle) is parallel to the reference line Z. FIG. 3 is a schematic view of a half-power beam width (HPBW) according to an embodiment of the disclosure. Referring to FIG. 3, it is assumed that the steering angle is zero degrees, and the HPBW ranges approximately from 15 degrees to 15 degrees.

Note that the size of the HPBW is related to the quantity of the first units. After being activated, the first units may be configured to form a beam with the desired HPBW and signal angle.

The antenna units $111_1$ to $111_5$ and $112_1$ to $112_8$ in FIG. 2A are disposed in a straight line. For example, in a row. More explicitly, the normals corresponding to the positions of the antenna units $111_1$ to $111_5$ and $112_1$ to $112_8$ in a row are on the same flat surface in the space. For example, the reference line Z is normal corresponding to the position of the antenna unit $111_5$, and the normal Z' of the antenna unit $111_3$ is located at the same flat surface at where the reference line Z is located. For the view of FIG. 2A, this flat surface is a surface facing toward the viewer.

Furthermore, there is a distance between any two adjacent antenna units of the antenna units $111_1$ to $111_5$ and $112_1$ to $112_8$. For example, there is a distance d between the antenna unit $111_5$ and the antenna unit $112_3$. The HPBW formed by the antenna units $111_1$ to $111_5$ and $112_1$ to $112_8$ can be determined as:

$$HBPW_0 = \frac{\lambda\sqrt{\pi}}{2Md}(\text{rad}) = \frac{0.886\lambda}{Md}(\text{rad}) = \frac{50.777\lambda}{Md}(\text{degree}) \quad (1)$$

$HPBW_0$ is the HPBW (or intrinsic HPBW) when the steering angle is 0 degrees, $\lambda$ is the wavelength of the signal transmission or the signal reception of the antenna unit $111_1$ to $111_5$, $112_1$ to $112_8$, M is the quantity of the first units in the same row, and d is the distance.

According to formula (1), the HPBW is related to the quantity M of the (activated) first units and the ratio of the distance d to the wavelength $\lambda$ of the signal. The quantity M of the first units can be determined by:

$$\frac{\lambda\sqrt{\pi}}{2HPBW \times d} + 1 > M \geq \frac{\lambda\sqrt{\pi}}{2 \times HPBW \times d}(\text{rad}) \quad (2)$$

HPBW is the half-power beam width. More explicitly, if the desired HPBW results in a non-integer number of M, M shall be the minimum integer greater than the calculated number.

For example, if the desired intrinsic half-power beam width is less than 25 degrees according to the formula, it can be obtained that if the number of the first units is 5, the intrinsic half-power beam width is 20.3 degrees. The controller 150 can select the first units according to the positions of the antenna units $111_1$ to $111_5$ and $112_1$ to $112_8$. For example, the desired signal angle corresponds to the surrounding area (e.g., between the antenna unit $111_3$ and the antenna unit $111_4$ and closer to the antenna unit $111_3$, or between the antenna unit $111_3$ and the antenna unit $111_2$ and closer to the antenna unit $111_3$) of the antenna unit $111_3$, the antenna units $111_1$ to $111_5$ are used as the first units (activated), and the antenna units $112_1$ to $112_8$ are used as the second units (disabled). Therefore, the antenna units $111_1$ to $111_5$ can radiate, and the antenna units $112_1$ to $112_8$ stop radiating.

Accordingly, if the difference between the direction of signal (DoS) and the normal of the central area of the selected first unit group is not zero, the difference can be minimized. That is, the required steering angle corresponding to the activated first unit $111_1$ to $111_5$ approaches zero, so that the energy efficiency of signal transmission and reception is actually improved.

In an embodiment, the controller 150 can select a reference point according to a predetermined direction of signal (DoS). The tangent plane corresponding to the reference point and the surface of the non-flat substrate 50 where the reference point is located is perpendicular to the predetermined direction of signal (DoS).

Figure 4:
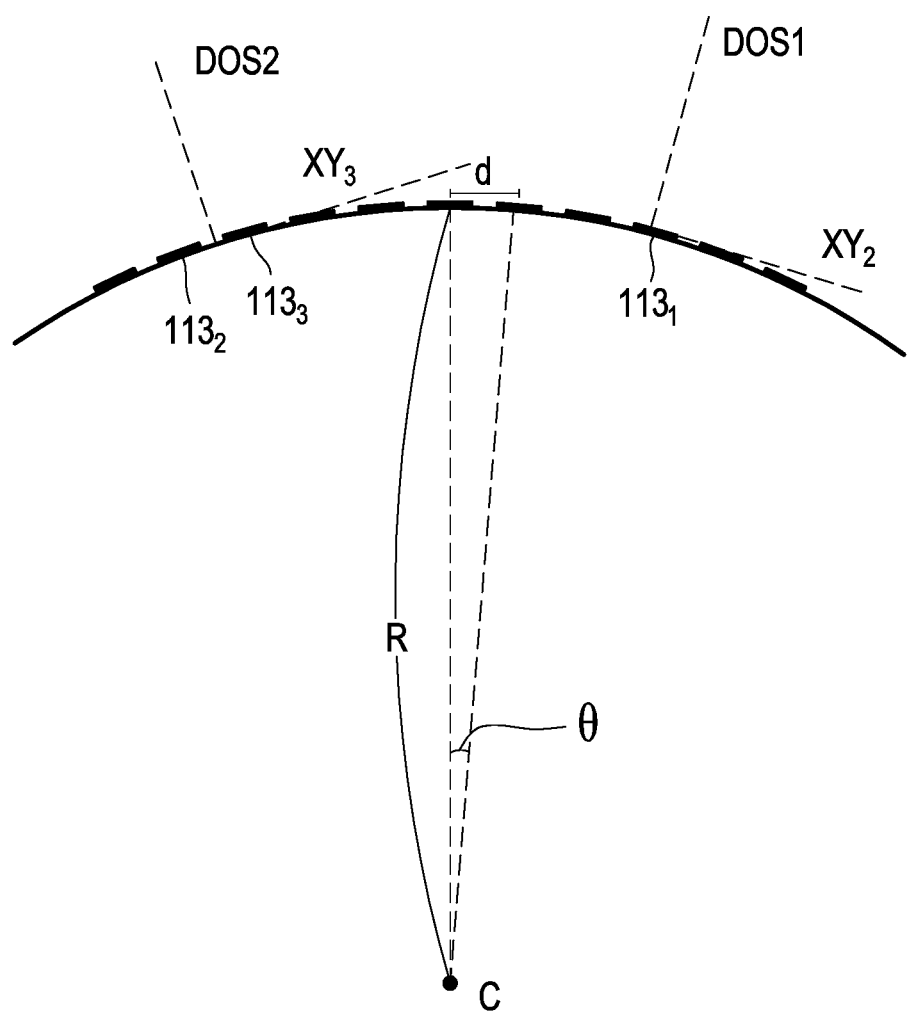
FIG. 4 is a schematic view illustrating how to determine a reference point according to an embodiment of the disclosure.

For example, FIG. 4 is a schematic view illustrating how to determine a reference point according to an embodiment of the disclosure. Referring to FIG. 4, a direction of signal DOS1 is perpendicular to a reference plane $XY_2$. The reference plane $XY_2$ is a tangent plane of the surface where the antenna unit $113_1$ is disposed. Therefore, the reference point is located on the antenna unit $113_1$. In addition, a direction of signal DOS2 is perpendicular to a reference plane $XY_3$. The reference plane $XY_3$ is the tangent plane on the curved surface. However, the junction between the extension line of the direction of signal DOS2 and the reference plane $XY_3$ is located between the surface where the antenna unit $113_2$ is disposed and the surface where the antenna unit $113_3$ is disposed. Therefore, the reference point is located between the antenna unit $113_2$ and the antenna unit $113_3$. In the example in FIG. 4, the controller 150 can be regarded as the reference point located in the area where the antenna array 110 is disposed.

Figure 5:
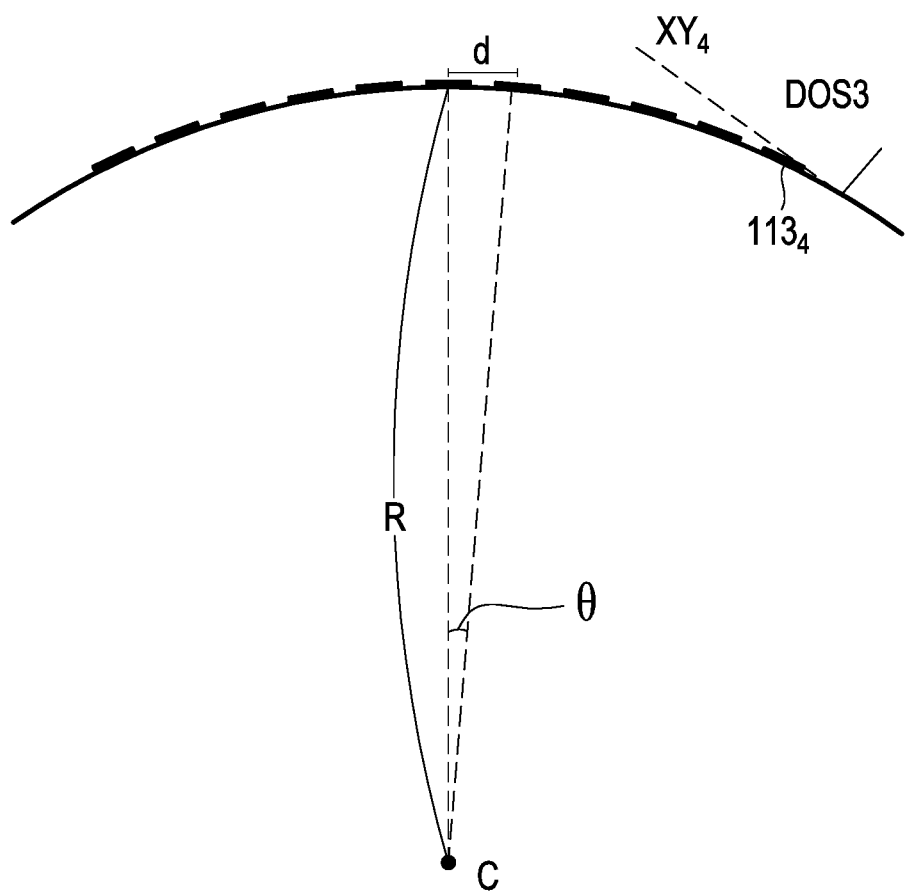
FIG. 5 is a schematic view illustrating how to determine a reference point according to another embodiment of the disclosure.

In another example, FIG. 5 is a schematic view illustrating how to determine a reference point according to another embodiment of the disclosure. Referring to FIG. 5, a direction of signal DOS3 is perpendicular to a reference plane $XY_4$. The reference plane $XY_4$ is the tangent plane on the curved surface. However, the junction between the extension line of the direction of signal DOS3 and the reference plane $XY_3$ is located on one side of the antenna unit $113_4$ but not between the other antenna units. Therefore, the controller 150 can be regarded as a reference point located outside the area where the antenna array 110 is disposed.

In an embodiment, if the reference point is located in the area where the antenna array 10 is located (as shown in FIG. 4), then the controller 150 can determine the quantity of the first units (e.g., the activated antenna units) in the straight row/straight line according to the half-power beam width. For example, the quantity of the first units can be calculated by formula (2).

In an embodiment, if the reference point is not located in the area where the antenna array 10 is located (as shown in FIG. 5), then the controller 150 can determine the half-power beam width change ratio according to the steering angle of the antenna array 10 and select the first units according to the half-power beam width and the half-power beam width change ratio. The steering angle is the difference between the normal of the tangent plane of the antenna unit located closest to the reference point and the predetermined signal angle. Taking FIG. 5 as an example, the angle between a normal N4 extending perpendicularly from the tangent plane of the surface where the antenna unit $113_4$ closest to the reference point is located and the signal angle DOS3 can be defined as the steering angle. Then the quantity M is calculated with the following formula:

$$M = \frac{50.777\lambda}{HPBW \times d\cos\theta_S} \text{(degree)} \quad (3)$$

$\theta_S$ is the steering angle. That is, the $\cos\theta_S$ (or its reciprocal, $\sec\theta_S$) in formula (3) can be regarded as the half-power beam width change ratio.

If the first unit has been determined, the phase delay additionally provided by the first units can be further determined when the first unit transmits and receives signals. Taking FIG. 2A as an example, it is assumed that the selected first units are five antenna units $111_1$ to $111_5$. The center of the antenna units $111_1$ to $111_5$ is the antenna unit $111_3$, and a normal Z' of the antenna unit $111_3$ on the non-flat substrate 50-1 is perpendicular to the antenna unit $111_3$. The normal Z' is perpendicular to the reference plane $XY_1$, and the phase delay of the antenna units $111_1$ to $111_5$ can be determined accordingly.

In an embodiment, the adjusting circuit 120 can compensate any one of the first units for the required phase difference when the first units receive or transmit signals according to the positions of at least two first units of the antenna units $110_1$ to $110_J$ on the non-flat substrate 50 and the predetermined signal angle. Specifically, when the antenna array 10 is to transmit and receive signals in the direction of signal (DoS), the phase difference required by an antenna unit (e.g., the antenna unit $111_1$ in FIG. 2) is directly related to the distance between the antenna unit and a reference plane orthogonally intersecting the direction of signal (DoS). Taking FIG. 2A as an example, when the direction of signal (DoS) is parallel to the normal Z' (e.g., the reference position is at the activated first unit), the compensating phase difference required by each activated antenna unit is related to the distance between each antenna unit and the reference plane $XY_1$.

Specifically, taking FIG. 2A as an example, it is assumed that there is a device-under-test (DUT) located at a center point C. Each of the antenna units $111_1$ to $111_5$ and $112_1$ to $112_8$ can be separately or integrally configured to form the array antenna 110, so it is possible to receive signals transmitted from the DUT or to transmit signals to the DUT in any direction within the direction range where the antenna units $111_1$ to $111_5$ and $112_1$ to $112_8$ are disposed.

In the embodiment (e.g., a uniform arc), the phase difference can be interpreted to be related to the path difference along the predetermined signal angle resulting from the angular difference and the distance between the normals of the two first units. The path difference refers to that based on the shape of the non-flat substrate, the electromagnetic wave of the DUT reaches an imaginary plane (e.g., the reference plane $XY_1$) of the groups of the first units in a direction parallel to the signal angle, but in fact there are differences between the paths of electromagnetic wave signals reaching each antenna unit.

Figure 6A:
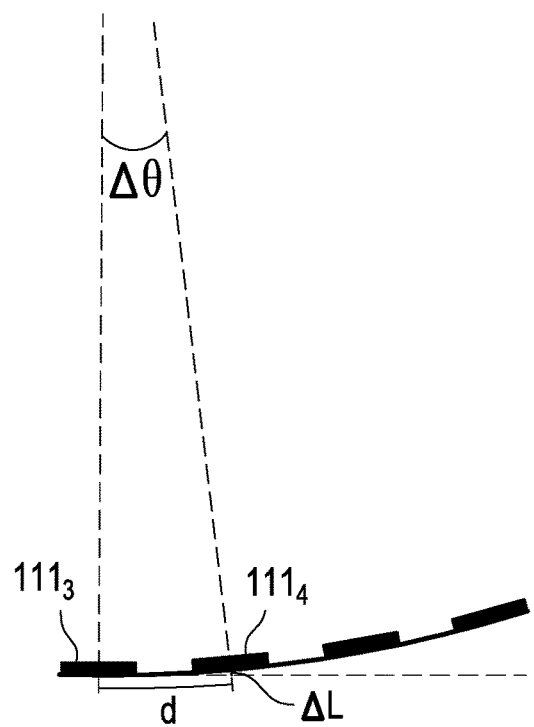
FIG. 6A is a partial enlarged view of FIG. 2A.

FIG. 6A is a partial enlarged view of FIG. 2A. Referring to FIG. 2A and FIG. 6A, it is assumed that in an arc-shaped surface of the non-flat substrate 50-1, the distance between the two antenna units $111_3$ and $111_4$ can be expressed as:

$$d = R\Delta\theta \quad (4)$$

$\Delta\theta$ is the angular difference between the normals of the two antenna units $111_3$ and $111_4$.

If the radius (e.g., R) of the arc is equal to m times the far field distance (e.g., $FR = 2D^2/\lambda$) (i.e., m is a multiple of the radius of the arc defined by the area occupied by the first units on the non-flat substrate 50 corresponding to the relative far-field distance), the angular difference can be expressed as:

$$\Delta\theta = 1/mN^2 \quad (5)$$

N is a multiple of the aperture of the first array defined by the first units with respect to the distance. The entire first units are regarded as the first array.

The path difference $\Delta L$ between the two antenna units $111_4$ and $111_5$ shown in FIG. 6A can be estimated as:

$$\Delta L = d\sin\frac{\Delta\theta}{2} = \frac{\lambda}{2}\sin\frac{\Delta\theta}{2}\sec\theta \quad (6)$$

$\theta$ is the predetermined signal angle (or departure/reception angle). If $mN^2$ is very large (making $\Delta\theta$ small), the phase difference $\Delta\psi$ added to the antenna unit $111_4$ can be expressed as:

$$\Delta\psi = \frac{\Delta L}{\lambda} \times 2\pi = \pi\sin\frac{\Delta\theta}{2}\sec\theta \cong \pi\sec\theta/2mN^2 \quad (7)$$

Accordingly, the specific first unit can be compensated for the phase difference through the adjusting circuit 120.

In one embodiment, if the signal angle is predetermined and the required steering angle is $\theta_S$, the phase difference can be expressed as:

$$\psi_n \cong \frac{2d\pi}{\lambda}\sin\left(\pm\frac{|n-\bar{n}|}{2mN^2} + \theta_S\right) \quad (8)$$

n is the sequence number of the first unit, $\psi_n$ is the phase difference of the n-th first unit, and $\bar{n}$ is the sequence number of the first unit corresponding to a predetermined signal angle. Taking FIG. 2A as an example, the sequence number of the antenna unit $111_1$ is 1, the sequence number of the antenna unit $111_2$ is 2, and the rest can be analogically reasoned. The sequence number of the center (i.e., the antenna unit $111_3$) of the antenna units $111_1$ to $111_5$ is 3. If the predetermined signal angle is 0 degrees, the transmission direction faces the center of the arc (e.g., the location of the antenna unit $111_3$). That is, the predetermined signal angle corresponds to the normal direction of the antenna unit $111_3$.

$$\pm\frac{|n-\bar{n}|}{2mN^2}$$

in formula (8) may be positive or negative according to the concave shape/surface (concave center, a positive sign is used) of the arc or the convex shape/surface (convex center, a negative sign is used) of the arc occupied by the first unit on the non-flat substrate 50. That is, the controller 150 controls the adjusting circuit 120 electrically connected to each first unit, and the transmitted and received signals are predetermined the phase difference obtained from the formula, so equivalently, the signals can be regarded as received by multiple first units in the reference plane.

Note that if the selected first units change, the imaginary normal, the imaginary plane, the relative steering angle, and the phase difference to be compensated for the group corresponding to the first units may also change.

In an embodiment, when the reference point is between two first units, the controller 150 may determine the phase difference for compensation according to a first unit closest to the reference point or the reference point.

If the first unit closest to the reference point is selected, the controller 150 can determine the phase difference according to formula (4) to formula (8). Based on the phase difference compensation, there are only minor but tolerable defects.

Figure 6B:
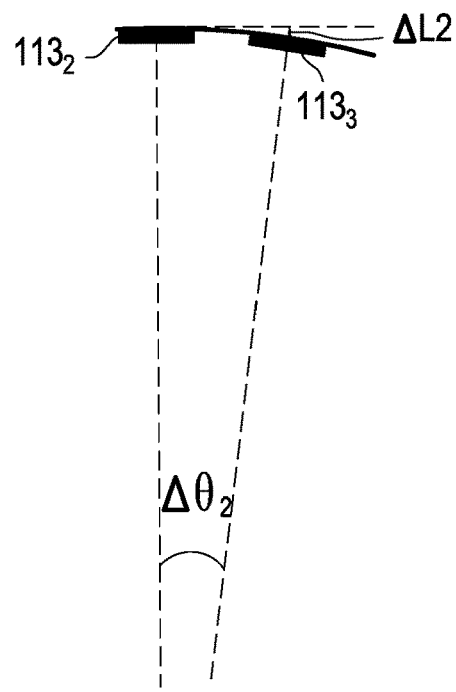
FIG. 6B is a partial enlarged view of FIG. 4.

Taking FIG. 6B as an example, FIG. 6B is a partial enlarged view of FIG. 4. Referring to FIG. 4 and FIG. 6B, the antenna units $113_3$ and $113_4$ shown in FIG. 4 are disposed on the convex surface of the arc, so $$-\frac{|n-\bar{n}|}{2mN^2}$$

in the formula (8) is selected. Assuming that the reference point is closer to the antenna unit $113_2$, the position of the antenna unit $111_4$ is then used as a reference point for modification, and $$\Delta L2 = d\sin\frac{\Delta\theta_2}{2}.$$

If the signal angle is predetermined, and the required steering angle is $\theta_S$, the phase difference can be expressed as:

$$\psi_n \cong \frac{2d\pi}{\lambda}\sin\left(-\frac{|n-\bar{n}|}{2mN^2} + \theta_S\right). \quad (9)$$

If the reference point is to be maintained, the controller 150 can determine the phase difference for compensation according to the reference point or the tangent plane of the surface where the reference point is located.

Figure 6C:
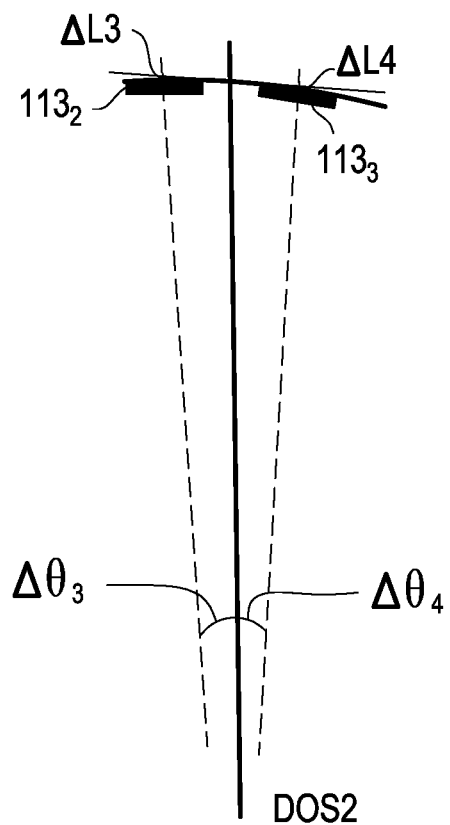
FIG. 6C is another partial enlarged view of FIG. 4.

Taking FIG. 6C as an example, FIG. 6C is another partial enlarged view of FIG. 4. Referring to FIG. 4 and FIG. 6C, as shown in FIG. 6C, the path difference $\Delta L3$ and $\Delta L4$ between the two antenna units $113_2$ and $113_3$ and the extension line of the direction of signal DOS2 (assumed to be located between the antenna units $113_2$ and $113_3$) can be estimated as:

$$\Delta L3 = \frac{d}{2}\sin\frac{\Delta\theta_3}{2} \quad (10)$$

-continued $$\Delta L4 = \frac{d}{2}\sin\frac{\Delta\theta_4}{2}. \quad (11)$$

In addition, the antenna units $113_2$ and $113_3$ are disposed on the convex surface of the arc, so $$-\frac{|n-\overline{n}|}{2mN^2}$$

(e.g., the formula (9)) in the formula (8) is also selected to determine the phase difference.

On the other hand, if the antenna units $110_1$ to $111_J$ are disposed on the concave surface of the arc (for example, as shown in FIG. 2A), $$+\frac{|n-\overline{n}|}{2mN^2}$$

in the formula (8) is selected. If the signal angle is predetermined, and the required steering angle is $\theta_S$, the phase difference can be expressed as:

$$\psi_n \cong \frac{2d\pi}{\lambda}\sin\left(\frac{|n-\overline{n}|}{2mN^2}+\theta_S\right). \quad (12)$$

In an embodiment, the controller 150 can compensate at least one of the antenna units $110_1$ to $110_J$ for the element factor through the adjusting circuit 120 according to the positions of the antenna units $110_1$ to $110_J$ on the non-flat substrate 50. Some or all of the antenna units $110_1$ to $110_J$ are not on the same plane or on the planes parallel to one another, so the radiation patterns (i.e., element factors) of the antenna units $110_1$ to $110_J$ may have different directions. The controller 150 can compensate at least one of the antenna units $110_1$ to $110_J$ according to the difference in direction, steering angle, and radiation pattern caused by the positions of the antenna units $110_1$ to $110_J$ on the non-flat substrate 50.

Figure 7:
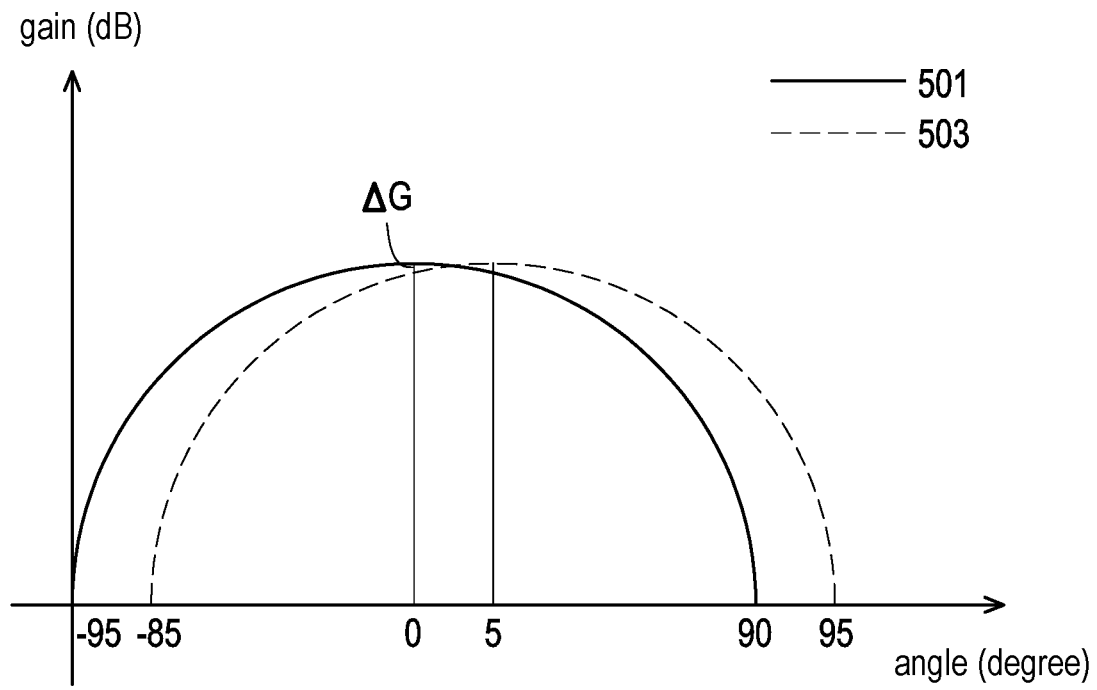
FIG. 7 is a schematic view of the radiation patterns of two antenna units according to an embodiment of the disclosure.

For example, FIG. 7 is a schematic view of radiation patterns 501 and 503 of the two antenna units $110_1$ and $110_2$ according to an embodiment of the disclosure. Referring to FIG. 7, it is assumed that the steering angle is 0 degrees and corresponds to the direction of the radiation pattern 501 of the antenna unit $110_1$, and the direction of the radiation pattern 505 of the antenna unit $110_2$ is 5 degrees. The two antenna units $110_1$ and $110_2$ are not on the same plane, so for the antenna unit $110_2$, the gain at 0 degrees may not be as good as that of the antenna unit $110_1$. Therefore, the controller 150 can compensate the signal of the antenna unit $110_2$ for the gain difference $\Delta G$.

In an embodiment, the controller 150 can compensate at least one of the antenna units $110_1$ to $110_J$ for the path loss through the adjusting circuit 120 according to the positions of the antenna units $110_1$ to $110_J$ on the non-flat substrate 50. Taking FIG. 5 as an example, the antenna units $110_1$ and $110_2$ are separated at a certain distance, causing a phase difference. The phase difference further causes path loss. Therefore, the controller 150 can compensate the signal of the antenna unit $110_2$ for the gain of the path loss.

Figure 8:
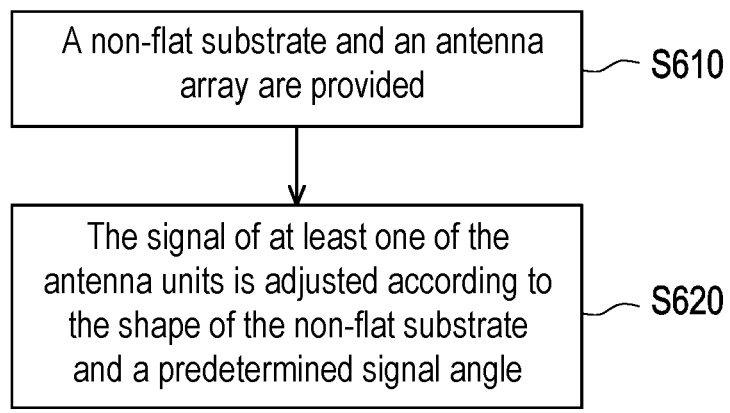
FIG. 8 is a flowchart illustrating a beam controlling method according to an embodiment of the disclosure.

On the other hand, FIG. 8 is a flowchart illustrating a beam controlling method according to an embodiment of the disclosure. Referring to FIG. 8, the non-flat substrate 50 and the antenna array 110 are provided (step S610). The signal of at least one of the antenna units $110_1$ to $110_J$ is adjusted according to the shape of the non-flat substrate 50 and the steering angle of the antenna array 110 (step S620).

The implementation details of each step in FIG. 8 are illustrated in detail in the foregoing embodiments and implementation manners, which are not repeated herein. In an embodiment, step S620 may be implemented by the controller 150 in cooperation with the adjusting circuit 120. In addition to being implemented in the form of a circuit, the steps and implementation details of the embodiments of the disclosure can also be implemented by the controller in the form of software, and the embodiments of the disclosure are not limited thereto.

In summary, in the beamforming apparatus and the beam controlling method of the embodiments of the disclosure, an antenna array disposed on a non-flat substrate is provided, and the signal of the antenna unit is adjusted according to the desired steering angle. In the embodiments of the disclosure, the activated first unit can be selected according to the desired beam pattern, and the selected first unit can be compensated for the amplitude and the phase. Accordingly, non-flat design antenna arrays can be applied in more scenarios.

What is claimed is:

1. A beamforming apparatus, comprising:
   a non-flat substrate;
   an antenna array comprising a plurality of antenna units and disposed on the non-flat substrate;
   an adjusting circuit coupled to the antenna array and configured to adjust a signal of at least one of the antenna units according to a shape of the non-flat substrate and a predetermined signal angle; and
   a controller coupled to the adjusting circuit and configured to:
   select at least two first units from the antenna units to transmit and receive electromagnetic waves according to the predetermined signal angle and a half-power beam width; and
   select a reference point according to a predetermined direction of signal (DOS), wherein a tangent plane corresponding to the reference point and a surface on the non-flat substrate where the reference point is located is perpendicular to the predetermined direction of signal.

2. The beamforming apparatus according to claim 1, wherein the at least two first units are disposed in a straight line, there is a distance d between any two adjacent first units of the at least two first units, and a quantity M of the at least two first units is:

$$\frac{\lambda\sqrt{\pi}}{2HPBW\times d}+1>M\geq\frac{\lambda\sqrt{\pi}}{2HPBW\times d},$$

where HPBW is the half-power beam width, and $\lambda$ is a wavelength of the signal.

3. The beamforming apparatus according to claim 1, wherein the controller is further configured to:
   determine a quantity of the at least two first units in a straight line according to the half-power beam width in response to that the reference point is located in an area where the antenna array is disposed; and
   determine a half-power beam width change ratio according to a steering angle of the antenna array, and select the at least two first units according to the half-power beam width and the half-power beam width change ratio in response to that the reference point is not located in the area, wherein the steering angle is a difference between a normal of a tangent plane of an antenna unit located closest to the reference point and the predetermined signal angle.

4. The beamforming apparatus according to claim 1, further comprising:
a memory coupled to the controller and configured to store positions of the antenna units on the non-flat substrate, wherein
the controller selects the at least two first units according to the positions of the antenna units.

5. The beamforming apparatus according to claim 1, wherein the adjusting circuit is further configured for compensating a phase difference of a signal of one of the at least two first units according to positions of the at least two first units of the antenna units on the non-flat substrate and the predetermined signal angle, wherein the phase difference is related to an angular difference between two of the at least two first units and a normal of the non-flat substrate.

6. The beamforming apparatus according to claim 5, wherein the at least two first units are disposed in a straight line, there is a distance between any two adjacent first units of the at least two first units, and the phase difference is further related to a path difference along the predetermined signal angle resulting from the angular difference and the distance.

7. The beamforming apparatus according to claim 6, wherein the phase difference $\Delta\psi$ is:

$$\Delta\psi = \frac{\Delta L}{\lambda} \times 2\pi,$$

where $\Delta L$ is the path difference, and $\lambda$ is a wavelength of the signal;
wherein $$\Delta L = d\sin\frac{\Delta\theta}{2},$$

where d is the distance, and $\Delta\theta$ is the angular difference.

8. The beamforming apparatus according to claim 6, wherein if the predetermined signal angle causes the required steering angle to be $\theta_S$ and the antenna units are disposed on a concave surface of the non-flat substrate, the phase difference corresponding to each of the first units is:

$$\psi_n \cong \frac{2d}{\lambda}\pi\sin\left(\frac{|n-\overline{n}|}{2mN^2} + \theta_S\right),$$

where n is a sequence number of the at least two first units, $\psi_n$ is the phase difference of an n-th first unit, $\overline{n}$ is a sequence number of a first unit corresponding to the predetermined signal angle, m is a multiple of a radius of an arc defined by an area occupied by the at least two first units on the non-flat substrate corresponding to the far field distance, and N is a multiple of an aperture of a first array defined by the at least two first units with respect to the distance.

9. The beamforming apparatus according to claim 6, wherein if the predetermined signal angle causes the required steering angle to be $\theta_S$ and the antenna units are disposed on a convex surface of the non-flat substrate, the phase difference corresponding to each of the first units is:

$$\psi_n \cong \frac{2d}{\lambda}\pi\sin\left(-\frac{|n-\overline{n}|}{2mN^2} + \theta_S\right),$$

where n is a sequence number of the at least two first units, $\psi_n$ is the phase difference of an n-th first unit, $\overline{n}$ is a sequence number of a first unit corresponding to the predetermined signal angle, m is a multiple of a radius of an arc defined by an area occupied by the at least two first units on the non-flat substrate corresponding to the far field distance, and N is a multiple of an aperture of a first array defined by the at least two first units with respect to the distance.

10. The beamforming apparatus according to claim 5, wherein the controller is further configured to:
in response to the reference point located between the two first units, the phase difference is determined according to a first unit closest to the reference point or the reference point, wherein a tangent plane corresponding to the reference point and a surface where the reference point is located is perpendicular to the predetermined direction of signal.

11. The beamforming apparatus according to claim 1, wherein the controller configured to:
determine a phase delay of the adjusting circuit for the antenna units.

12. The beamforming apparatus according to claim 1, wherein the controller is further configured to:
compensate at least one of the antenna units for an element factor through the adjusting circuit according to positions of the antenna units on the non-flat substrate.

13. The beamforming apparatus according to claim 1, wherein the controller is further configured to:
compensate at least one of the antenna units for a path loss through the adjusting circuit according to positions of the antenna units on the non-flat substrate.

14. A beam controlling method, comprising:
providing a non-flat substrate and an antenna array, wherein the antenna array comprises a plurality of antenna units and is disposed on the non-flat substrate;
adjusting a signal of at least one of the antenna units according to a shape of the non-flat substrate and a predetermined signal angle;
selecting at least two first units from the antenna units to transmit and receive electromagnetic waves according to the predetermined signal angle and a half-power beam width; and
selecting a reference point according to a predetermined direction of signal (DOS), wherein a tangent plane corresponding to the reference point and a surface on the non-flat substrate where the reference point is located is perpendicular to the predetermined direction of signal.

15. The beam controlling method according to claim 14, wherein the at least two first units are disposed in a straight line, there is a distance d between any two adjacent first units of the at least two first units, and a quantity M of the at least two first units is determined by:

$$\frac{\lambda\sqrt{\pi}}{2HPBW \times d} + 1 > M \geq \frac{\lambda\sqrt{\pi}}{2HPBW \times d},$$

where HPBW is the half-power beam width, and λ is a wavelength of the signal.

16. The beam controlling method according to claim 14, further comprising:
  determining a quantity of the at least two first units in a straight line according to the half-power beam width in response to that the reference point is located in an area where the antenna array is disposed; and
  determining a half-power beam width change ratio according to a steering angle of the antenna array, and selecting the at least two first units according to the half-power beam width and the half-power beam width change ratio in response to that the reference point is not located in the area, wherein the steering angle is a difference between a normal of a tangent plane of an antenna unit located closest to the reference point and the predetermined signal angle.

17. The beam controlling method according to claim 14, wherein the step of adjusting the signal of at least one of the antenna units according to the shape of the non-flat substrate and the predetermined signal angle comprises:
  compensating a phase difference of a signal of one of the at least two first units according to positions of the at least two first units of the antenna units on the non-flat substrate and the predetermined signal angle, wherein the phase difference is related to an angular difference between two of the at least two first units and a normal of the non-flat substrate.

18. The beam controlling method according to claim 17, wherein the at least two first units are disposed in a straight line, there is a distance between any two adjacent first units of the at least two first units, and the phase difference is further related to a path difference along the predetermined signal angle resulting from the angular difference and the distance.

19. The beam controlling method according to claim 18, wherein the phase difference $\Delta\psi$ is:

$$\Delta\psi = \frac{\Delta L}{\lambda} \times 2\pi,$$

where $\Delta L$ is the path difference ($\Delta L, \Delta L2, \Delta L3, \Delta L4$), and λ is a wavelength of the signal;
wherein $$\Delta L = d\sin\frac{\Delta\theta}{2},$$

where d is the distance, and $\Delta\theta$ is the angular difference.

20. The beam controlling method according to claim 18, wherein if the predetermined signal angle causes the required steering angle to be $\theta_S$ and the antenna units are disposed on a concave surface of the non-flat substrate, the phase difference corresponding to each of the first units is:

$$\psi_n \cong \frac{2d}{\lambda}\pi\sin\left(\frac{|n-\bar{n}|}{2mN^2} + \theta_S\right),$$

where n is a sequence number of the at least two first units, $\psi_n$ is the phase difference of an n-th first unit, $\bar{n}$ is a sequence number of a first unit corresponding to the predetermined signal angle, m is a multiple of a radius of an arc defined by an area occupied by the at least two first units on the non-flat substrate corresponding to the far field distance, and N is a multiple of an aperture of a first array defined by the at least two first units with respect to the distance.

21. The beam controlling method according to claim 18, wherein if the predetermined signal angle causes the required steering angle to be $\theta_S$ and the antenna units are disposed on a convex surface of the non-flat substrate, the phase difference corresponding to each of the first units is:

$$\psi_n \cong \frac{2d}{\lambda}\pi\sin\left(-\frac{|n-\bar{n}|}{2mN^2} + \theta_S\right),$$

where n is a sequence number of the at least two first units, $\psi_n$ is the phase difference of an n-th first unit, $\bar{n}$ is a sequence number of a first unit corresponding to the predetermined signal angle, m is a multiple of a radius of an arc defined by an area occupied by the at least two first units on the non-flat substrate corresponding to the far field distance, and N is a multiple of an aperture of a first array defined by the at least two first units with respect to the distance.

22. The beam controlling method according to claim 17, further comprising:
  in response to the reference point located between the two first units, determining the phase difference according to a first unit closest to the reference point or the reference point, wherein a tangent plane corresponding to the reference point and a surface where the reference point is located is perpendicular to the predetermined direction of signal.

23. The beam controlling method according to claim 14, further comprising:
  compensating at least one of the antenna units for an element factor according to positions of the antenna units on the non-flat substrate.

24. The beam controlling method according to claim 14, further comprising:
  compensating at least one of the antenna units for a path loss according to positions of the antenna units on the non-flat substrate.

\* \* \* \* \*